March 5, 1929.  P. G. JOHNSON  1,704,003
PIPE JOINT
Filed Aug. 19, 1925

Patented Mar. 5, 1929.

1,704,003

UNITED STATES PATENT OFFICE.

PERCY GRAHAM JOHNSON, OF LONDON, ENGLAND, ASSIGNOR TO VICTAULIC COMPANY LIMITED, OF LONDON, ENGLAND.

PIPE JOINT.

Application filed August 19, 1925, Serial No. 51,129, and in Great Britain August 28, 1924.

The invention relates to pipe joints of the kind wherein a sealing ring of flexible material extends across and seals the gap between the adjacent ends of pipes to be joined. While the invention is applicable to pipe joints having various types of sealing rings for spanning the gaps between the ends of pipes, it is particularly applicable to pipe joints in which the sealing rings have annular chambers for receiving fluid from the pipes, and which have flanges adapted to bear upon the exterior surfaces of the pipes and adapted to be pressed into sealing engagement with them by the pressure of the fluid carried by the pipes.

The object is to provide means for preventing undue movements of the members of the joint along the pipes, particularly when the pipes and members of the joint are not provided with inter-engaging parts such as flanges, grooves, and the like for preventing such movements.

Figure 1:
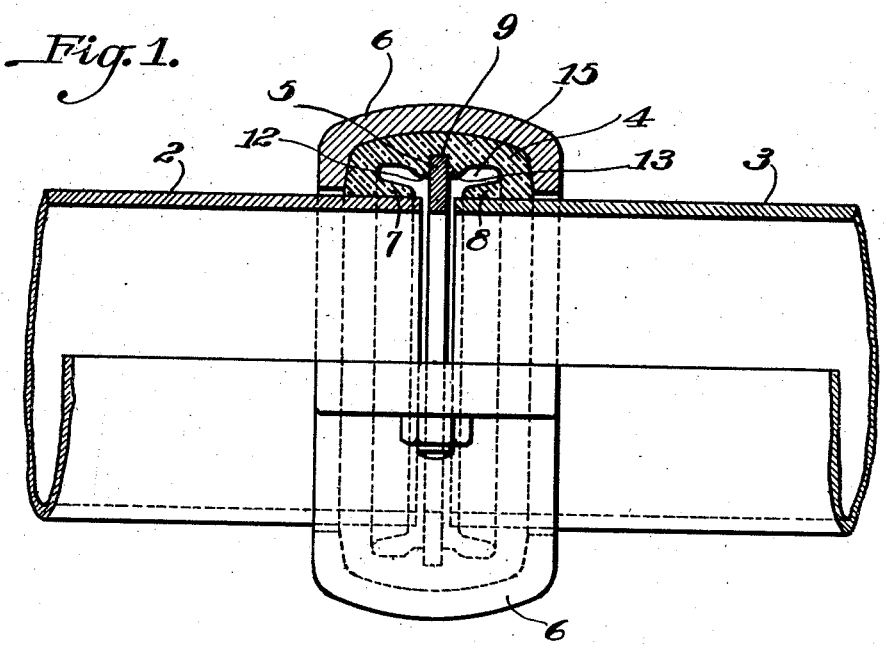
Figure 2:
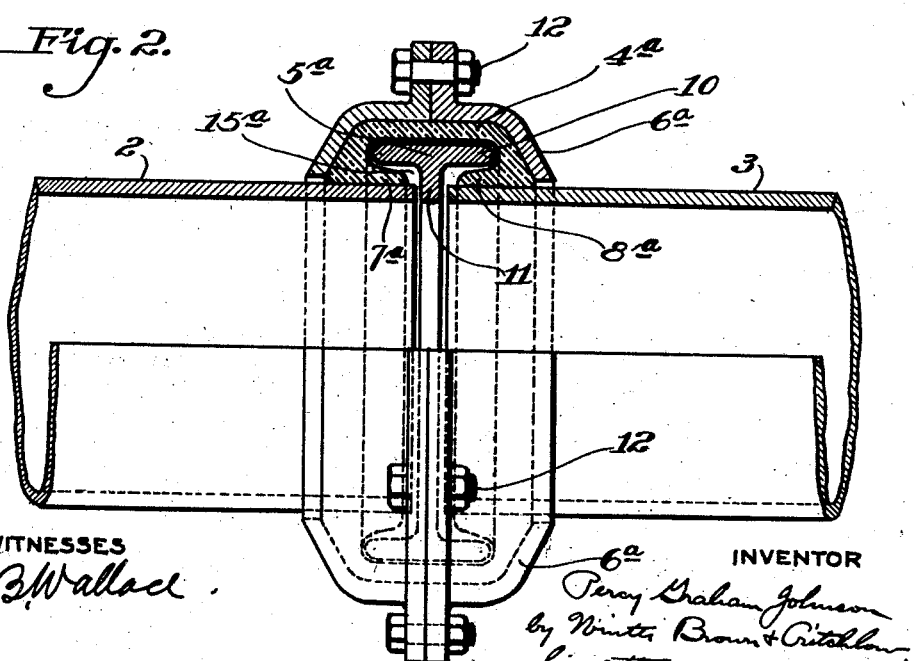

Two embodiments of the invention are illustrated in the accompanying drawings, of which Figs. 1 and 2 are longitudinal central sectional views through the adjacent ends of pipes and joints connecting them.

In the practice of the invention a gap between the adjacent ends of two pipes is spanned by a flexible sealing ring which bears upon the outer surfaces of the pipes, and a positioning ring engages the sealing ring and extends into the gap between the ends of the pipes, so that if the sealing ring moves upon the pipes its movement will be limited by the engagement of the inwardly extending portion of the positioning ring with the end of one or the other of the pipes.

Having reference to the embodiment of the invention illustrated in Fig. 1, the gap between the adjacent ends of two pipes 2 and 3 is spanned by a flexible sealing ring 4 having an annular fluid-receiving chamber 15 and provided with flanges or lips 7 and 8 which bear upon the outer surfaces of the pipes. The sealing ring here shown is the same as that disclosed in Patent No. 1,541,601 to Tribe granted June 9, 1925, and such ring is used in preferance to others which span the gaps between pipes. The positioning ring in this case is a flat metal ring 5 of uniform section, the outer periphery of which extends into a groove 9 in the body or back of sealing ring 4. The sealing ring at the sides of groove 9 is provided with stiffening ribs 12 and 13 to firmly engage positioning ring 5, which, as shown, extends inwardly and lies in the gap between the ends of the pipes. Sealing ring 4 is preferably surrounded by and held in an annular channel-shaped metal housing 6.

In the embodiment of the invention illustrated in Fig. 2, the sealing ring 4ª is the same as ring 4 in Fig. 1, except that ring 4ª is not provided with a special groove for receiving the positioning ring. In this case a positioning ring 5ª of T-shaped cross section has its head 10 arranged in the pressure-receiving chamber 15ª of the sealing ring, and has its web member or center flange 11 lying in the gap between the pipes. The head 10 of positioning member 5 is of substantially the same width as the annular chamber of the sealing ring, and therefore effectively engages said ring. In this embodiment of the invention the sealing ring is illustrated as being held in an annular metal housing 6ª formed of two parts meeting in a plane transversely of the axis of the pipes and connected to each other by bolts 12.

In both embodiments of the invention, the pipes 2 and 3 are not provided externally with flanges, grooves or equivalent configurations for engagement by the members of the pipe joints to prevent movements of the joints upon the pipes. Such movements are prevented by the inwardly extending portions of the positioning rings, which, however, preferably do not extend inwardly beyond the interior walls of the pipes, and therefore do not diminish their effective diameters. The advantage of using plain-end pipes resides first in their cheapness, and secondly in the ease of making joints between them and of taking out and replacing a section of pipe in a line, as will be understood when it is observed that a plain-end pipe may be slipped into an assembled pipe joint of the character shown herein.

According to the provisions of the patent statutes I have explained the principle and operation of my invention, and have illustrated what I now consider to represent its best embodiments. However, I desire to have it understood that, within the scope of the appended claims, the invention may be practiced by other forms of construction than those specifically shown and described.

I claim as my invention:

1. The combination of two pipes having their ends adjacent to each other with a gap between them, of a unitary flexible sealing ring spanning the gap between said pipes and having an annular pressure chamber and provided with flanges slidably bearing upon the outer surface of the pipe ends, a metal housing enclosing said sealing ring, and a positioning ring extending into said chamber of the sealing ring and unconnected to said housing, a portion of said positioning ring lying in the gap between the ends of said pipes.

2. The combination of two pipes having their ends adjacent to each other with a gap between them, of a unitary flexible sealing ring spanning the gap between said pipes and having an annular pressure chamber and provided with flanges slidably bearing upon the outer surface of the pipe ends, and a positioning ring T-shaped in cross section having its head lying in said chamber of the sealing ring and its center flange lying in the gap between the ends of said pipes.

In testimony whereof, I sign my name.

PERCY GRAHAM JOHNSON.